United States Patent Office 3,027,359
Patented Mar. 27, 1962

3,027,359
TERTIARY PHOSPHINE POLYMERIZATION CATALYSTS SYSTEM
Hans Wolfgang Jurgeleit, Davenport, Iowa, assignor to the United States of America as represented by the Secretary of the Army
No Drawing. Filed June 19, 1959, Ser. No. 821,612
4 Claims. (Cl. 260—88.7)
(Granted under Title 35, U.S. Code (1952), sec. 266)

The invention described herein may be manufactured and used by or for the Government for governmental purposes without the payment to me of any royalty thereon.

The present invention relates to the polymerization of vinyl compounds containing electron attracting substituents and more particularly to a process for obtaining white acrylonitrile polymers having a definite, predeterminable, dilute solution viscosity. Monomers which may be polymerized by the same process are, for example, methacrylonitrile, acrylamide, and methacrylamide, as well as the N-substituted derivatives of acrylamide and methacrylamide.

The polymerization of acrylonitrile is usually carried out in aqueous solutions by means of a redox system. This latter initiator system is of the radical type and works at room or elevated temperatures only.

It has been shown that polymers of acrylonitrile may be obtained at low temperatures by an ionic type polymerization in bulk, or in an inert, organic solvent, using tertiary phosphines containing at least one alkyl group as initiators, as, for example, described in my United States patent application, Serial No. 481,701, filed January 13, 1955. These polymers are assumed to be substantially unbranched because of the low temperature used in their preparation and the anionic mechanism of the polymerization reaction. Unbranched vinyl polymers are superior with regard to certain applications when compared with branched vinyl polymers of the same chemical composition. E.g., the quality of spinning solutions as well as the tensile strength and the elastic properties of the final filaments are better if an unbranched vinyl polymer is used in the manufacturing process.

The polymerization by tertiary phosphines, however, is somewhat difficult to handle since traces of water influence both the course of the reaction and the quality of the resulting polymer to an extremely high degree. Larger amounts of water, e.g., about 0.1% and more (calculated from the acrylonitrile weight), prevent any polymerization in this system.

Traces of water decrease remarkably the molecular weight of the resulting polymer. In addition, since it is difficult to determine the exact amount of water traces present in the reaction system, it is almost impossible to predetermine the dilute solution viscosity (or the corresponding molecular weight) of the resulting polymer. Moreover, the polymer obtained will show a slight yellowish to yellow-brownish tinge, this hue obviously increasing in proportion to the amount of water present in the system. The absolute removal of water is, however, if possible at all, only realizable under very laborious efforts.

It has been proposed to add $CaCl_2$ to the reaction mixture in order to obtain substantially white polymers by removing most of the water as well as other unknown contaminants which, by reaction with the tertiary phosphine, or, with the growing polymer, may favor a discoloration of the end product. By this process, quite good results, i.e., almost pure white polymers, are obtained. In spite of this, however, it is still difficult to produce a polymer having a predetermined relative viscosity. In spite of careful drying under exactly the same conditions with the same amounts of calcium chloride added and using the same amount of triethylphosphine as an initiator, the polymerization of identical batches of acrylonitrile resulted in polymers of different molecular weights.

The present process reveals how to obtain white acrylonitrile polymers having a definite, predeterminable dilute solution viscosity. Since exact figures for molecular weights are difficult to obtain, it is common practice to determine the dilute solution viscosity, that is, the relative viscosity of a polymer solution in dimethylformamide. For practical purposes this relative viscosity is a sufficient measure of the approximate range of the molecular weight of the polymer as well as a means of determining whether two products are of the same average molecular weight.

In the process described herein, the dilute solution viscosity of the resulting polymer is only dependent on the amount of tertiary phosphine containing at least one alkyl group added to the system, provided all other easily controllable conditions such as temperature, concentration, etc., are the same. The influence of uncontrollable traces of water or other contaminants on the molecular weight has been eliminated. In addition, it is an advantage of the process that all troublesome, extreme drying and purification procedures, e.g., by heating the reaction vessel in a high vacuum or the laborious fractional distillation of the reagents, are no longer necessary. Only normal drying and normal purification are required.

In the process described herein the polymerization of acrylonitrile by tertiary phosphines containing at least one alkyl group is carried out in the presence of a small amount of an alkali metal compound selected from the group consisting of alkali metal hydrides such as potassium hydride, sodium hydride, or lithium hydride, alkali metal borohydrides such as lithium borohydride, and alkali metal aluminum hydrides such as lithium aluminum hydride.

In general, the tertiary phosphines are of the general formula:

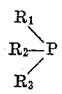

wherein $R_1$, $R_2$, and $R_3$ are members selected from the group consisting of alkyl and aryl groups. $R_1$, $R_2$, and $R_3$ may each be different, but at least one of them should be an alkyl group. Tertiary phosphines which may be used in this type of polymerization are selected from the class including triethylphosphine, trimethylphosphine, tri-isobutylphosphine, and other trialkylphosphines. Mixed alkylphosphines, such as diethylmonomethylphosphines, as well as alkyl-arylphosphines, such as dimethylphenylphosphine, may also be used. Furthermore, it is possible to use mixtures of two or more tertiary phosphines as an initiator system.

A preferred process involves the pretreatment of all reagents and solvents used in the polymerization reaction with small amounts of sodium hydride, as well as adding further small amounts of sodium hydride to the batch mixture.

Sodium hydride does not react with absolutely dry acrylonitrile. With wet acrylonitrile, however, it forms some grey-white to yellowish polymeric products which have a poor quality. Normally dried acrylonitrile, e.g., dried by standing over calcium chloride, forms only minor amounts of this polymeric product. In any case, however, these products should be removed by simple filtration in order not to deteriorate the quality of the finally synthesized polymer.

The extent of the reaction between acrylonitrile and sodium hydride can be reduced by diluting acrylonitrile with about the same amount of an inert solvent, preferably the same that is used in the following polymerization reaction. By treating such a solution of acrylonitrile in an inert solvent with sodium hydride only a very small amount of grey-white, inferior polymer is formed which can be easily removed by filtration. Inert solvents used in this polymerization process are preferably selected from the group consisting of liquid aliphatic, alicyclic and aromatic hydrocarbons, and their mixtures, such as n-heptane, petroleum ether, light naphtha, gasoline, toluene, xylene, tetrahydronaphthalene, and decahydronaphthalene. Other suitable inert solvents which can be used are ethers, such as diethyl ether, dioxane, and tetrahydrofurane.

The phosphines are usually applied in the form of a solution in the inert solvent. These solutions are advantageously pretreated with sodium hydride or other alkali metal compounds by running them through a short column filled with sodium hydride. The same treatment is indicated for the solvent or diluent used to dissolve or dilute acrylonitrile.

The amount of sodium hydride present in the reaction mixture (excluding that used for pretreatment) may be in the range of 0.5 to 5% by weight (calculated on the amount of acrylonitrile), preferably in the range of 1 to 2% by weight, but smaller amounts are also effective to provide anhydrous conditions. Sodium hydride is advantageously used in form of a 50% or 25% dispersion in mineral oil or any other inert medium, such as tetrahydronaphthalene, xylene, naphthalene, or petrolatum. The particle size of these dispersions is in the range of 1–20 microns. With some precaution these dispersions can be handled safely and are easy to weigh.

The amount of inert solvent or diluent in the polymerization reaction should be sufficient to keep the reaction mixture liquid up to the final stages of the reaction, so that it can be easily stirred. Thus, with a given amount of monomer, the amount of solvent or diluent necessary in the reaction mixture is dependent on the quantity of tertiary phosphine used for initiation. Larger quantities of tertiary phosphine will bring about a very fast reaction evolving large amounts of heat rapidly. In order to dissipate this heat, larger quantities of solvent are necessary as a heat transfer agent. On the other hand, small quantities of tertiary phosphine will bring about a slowly proceeding reaction, thus requiring a smaller amount of heat transfer agent (solvent or diluent) to remove the evolved heat.

The dilute solution viscosity of a polymer synthesized by large amounts of tertiary phosphine will be low, while small amounts of tertiary phosphine result in a larger viscosity value.

The polymerization reaction may, if desired, be carried out in the absence of any solvent or diluent. In performing such a bulk polymerization, sufficient heat transfer should be provided by a kneader or a similar device to remove the evolved heat by cooling, thus preventing overheating. Excessively high temperatures, even when existing only locally, will severely deteriorate the quality of the polymer and lead to discoloration.

The polymerization process described herein may advantageously be started by adding the solution of tertiary phosphine to a cooled solution or dispersion of acrylonitrile in an inert solvent or diluent. At the beginning, the temperature of the reaction mixture should be in the range from about 0° to −50° C., but preferably from about −20° to about −30° C. The temperature is then raised gradually as the reaction proceeds, thereby taking care that no spontaneous evolution of heat takes place. In the final stage, the temperature is maintained for 15 minutes to 2 hours, but preferably ½ hour on a constant level, thus guaranteeing that the resulting polymer will reach a uniform composition. The time period required to raise the temperature from the starting level up to the final temperature, hereinafter referred to as the "temperature-time curve," as well as the time period at which the final constant temperature is maintained, are factors that have to be strictly observed in order to obtain reproducible results. A good cooling system is indispensable to guarantee that the reaction temperature will not rise too rapidly. Otherwise, the resulting polymer may be seriously impaired.

In most cases, the tertiary phosphine is not entirely consumed in the polymerization reaction, the percentage left at the end depending mostly on the final constant temperature.

Most important is the adequate termination of the polymerization reaction. The termination should be carried out when the reaction mixture reaches a certain desired viscosity (depending on the amount of inert diluent and on the desired molecular weight). The viscosity of the mixture may be determined by the energy necessary to move the stirrer at a constant speed. The required energy will increase as the viscosity increases.

The termination is easily completed by pouring the reaction mixture into an excessive amount of cold methanol or any other low molecular weight alcohol until all sodium hydride is destroyed. Then some diluted mineral acid (1:1), such as hydrochloric acid, sulfuric acid, or nitric acid, is added in order to destroy the phosphine not consumed. The methanol used may be cooled either by externally applying a cooling mixture of Dry Ice and acetone or by the addition of Dry Ice directly into the methanol. The temperature of the methanol should be preferably about −20 to −30° C. The cold methanol may also be poured under vigorous stirring directly into the reaction. The product is then filtered by conventional means and washed.

Traces of phosphine may stick very obstinately to the final polymer. These traces, however, can be easily destroyed by washing the filter cake with dilute hydrogen peroxide, preferably a 1 to 3% solution, for 2 to 5 minutes. A polymer, that has not been washed carefully enough and, therefore, still contains some traces of tertiary phosphine or acrylonitrile monomer, may discolor in the subsequent drying process at elevated temperatures (about 110° C.).

As outlined above, it is an important feature of this process that the dilute solution viscosity (and with it the molecular weight) of the polymer can be easily predetermined at a given concentration and an identical temperature-time curve solely by the amount of tertiary phosphine added. Thus, with this process it is possible to produce separate batches of polymers having substantially identical dilute solution viscosities (or average molecular weights). It is possible to synthesize, by means of this process, polymers ranging from very low dilute solution viscosities to very high dilute solution viscosities, these results being obtained simply by varying the amount of tertiary phosphine used as initiator.

This is not possible by use of the processes of phosphine polymerization described in the literature up to date. The dilute solution viscosity (or the average molecular weight) of the polymers produced by prior art methods has been more or less a matter of luck, depending on indeterminable traces of contaminants.

As a result, it has previously not been possible to carry out the polymerization of acrylonitrile by tertiary phosphines on a large scale, e.g., for commercial purposes. The extremely difficult purifying and drying procedures required for the successful performance of these prior art polymerization processes were not feasible in a large scale apparatus, at least not at reasonable cost. The new process of this invention simplifies the polymerization process in such a way as to make it useful in the commercial synthesis of acrylonitrile polymers.

The following specific examples will serve to illustrate the present invention and the preparation of polymers, but are not to be construed as limiting its scope. All parts and percentages are by weight unless otherwise indicated.

Example 1

132.5 ml. acrylonitrile (=106 g.=2 mole) were dried in the usual way over calcium chloride, decanted from the drying agent and treated with about 1 g. of sodium hydride. After about 10 minutes, the sodium hydride was removed by filtration and the acrylonitrile added to a mixture of 400 ml. of xylene and 0.6 g. of fresh sodium hydride. This mixture was stirred vigorously and cooled to −30° C. in a nitrogen flushed reaction vessel. Then a solution of 0.710 g. of triethylphosphine (=6 millimole) in 100 ml. of xylene was added. This solution had been pretreated by running over 1 g. of sodium hydride on a glass filter. Over a period of 1 hour the temperature was gradually raised to 10° C. and this temperature was then maintained for another hour. The mixture was stirred without interruption. Finally a viscous paste was formed. The polymerization was terminated by adding 1000 ml. of methanol which had been cooled to −30° C. by addition of Dry Ice. After about 10 minutes, 100 ml. of hydrochloric acid (1:1) was added. The resulting white dispersion of polyacrylonitrile particles was filtered. The polymer obtained was thoroughly washed alternately with water, hydrochloric acid (1:1), and water, and finally dried in an oven at 110° C.

The polymer had a relative viscosity of 1.5 in dimethylformamide. The viscosity $\eta_{rel}$ was determined from the flow time of a 1% solution in dimethylformamide ($V_1$) and the flow time of the solvent ($V_2$) according to the following formula:

$$\eta_{rel} = \frac{V_1}{V_2}$$

Viscosity measurements were made in a Zeitfuchs viscometer tube as described in Test D445–53T, Appendix E, published by American Society of Testing Materials. The yield was 69 g.=64.9%, calculated on the amount of acrylonitrile used in the reaction.

Example 2a 132.5 ml. (=106 g.=2 mole) of acrylonitrile were dried over calcium chloride and pretreated by sodium hydride as described in Example 1. The filtered acrylonitrile then was mixed with 450 ml. of xylene and 1.2 g. of a 50% sodium hydride dispersion in mineral oil. This mixture was cooled to −20° C. under vigorous stirring. The reaction vessel was flushed with dry nitrogen gas.

The following were quickly added to the reaction mixture with stirring: 0.121 g. of triethylphosphine (=1 millimole), dissolved in 50 ml. of xylene which had been pretreated with sodium hydride. Under strong stirring, the temperature of the reaction mixture was raised to 10° C. over a period of half an hour and maintained at this temperature for another full hour.

The polymerization reaction was terminated by quickly pouring the reaction mixture under stirring into 1000 ml. of methanol which had been cooled to −20° C. After 10 minutes, while still continuing to agitate the mixture, 10 ml. of hydrochloric acid (1:1) were added.

The resulting polyacrylonitrile was isolated from the liquid part by filtration and after that thoroughly washed alternately with water, hydrochloric acid (1:1), and water, until all phosphine traces were removed. After drying at 110° C., 98.5 g. of a white polymer were obtained, that is, a yield of 93% calculated on the amount of acrylonitrile used in the reaction. The relative viscosity of a 1% solution of this polymer in dimethylformamide was 3.48.

Example 2b

In a second run under exactly the same conditions as described in Example 2a, using the same amounts of reagents and the same temperature-time curve, a yield of 97 g. polymer (=91.5%) was obtained which had a relative viscosity of 3.52.

A small sample of this polymer was isolated from the reaction mixture by filtration only, without washing afterwards. This sample of white polymer became discolored when dried in an oven at 110° C., thus, showing the importance of careful washing for the quality of the end product.

Example 3a 66.3 ml. of acrylonitrile (=53 g.=1 mole) were dried over calcium chloride and pretreated by sodium hydride as described in Example 1. The filtered acrylonitrile was then mixed with 800 ml. of n-heptane and 1.2 g. of a 50% sodium hydride dispersion in mineral oil. This procedure was carried out in a reaction vessel which had been previously flushed with nitrogen. The mixture was cooled to −50° C. A solution of 8.26 g. of triethylphosphine (=70 millimole) in 100 ml. of n-heptane was run over 1 g. of sodium hydride and then added under vigorous stirring to the reaction mixture.

The temperature of the reaction mixture was, while continuing stirring, gradually raised to 0° C. within 1 hour, care being taken to ensure that no uncontrolled temperature rise took place. For another full hour, the temperature was maintained at 0° C.

After this, the polymerization was terminated by adding with stirring 500 ml. of cold methanol (−40° C.) to the reaction vessel. 10 minutes later 300 ml. of hydrochloric acid (1:1) were added with continued stirring.

After carefully washing the filtered polymer alternately with water, methanol, hydrochloric acid (1:1), and water, a white polymer was obtained that showed no detectable traces of phosphine, that is, no odor and no reaction with carbon disulfide which would develop a red color. The yield was 42 g.=80% polyacrylonitrile which had a relative viscosity of 1.12. The polymer was partly soluble in acetone.

Example 3b

A run under the same conditions as described in Example 3a, but changing the temperature-time curve, was made. In this run, the reaction mixture was cooled to −50° C. and the temperature was gradually raised to 0° C. over a period of 5 hours, then maintained at this temperature for another full hour.

There were formed two different products which could be easily separated since they formed two different layers of the filter cake. The yield consisted of 6.8 g. of a fine, white, powder and 30 g. of a slightly grey powder of a somewhat coarser appearance (total yield=69%). The fine powder had a relative viscosity of 2.4, while the coarse powder had a relative viscosity of 1.07.

Example 4

4.72 g. (=40 millimole) of triethylphosphine were dissolved in 100 ml. of n-heptane and run over a column filled with approximately 1 g. of sodium hydride. The filtered solution of triethylphosphine was then mixed in a reaction vessel under stirring with 400 ml. of n-heptane and 0.6 g. of a 50% sodium hydride dispersion in mineral oil. This reaction mixture was cooled to −50° C.

Under continuous stirring, 66.3 ml. (=53 g.=1 mole) of acrylonitrile were dropped in within a period of 5 minutes. This acrylonitrile had been dried with calcium chloride and pretreated with sodium hydride as mentioned in Example 1.

The temperature of the reaction mixture was then raised to 10° C. over a period of 1 hour.

After this, the reaction was terminated as described in Example 1 by addition of cold methanol. A yield of 40 g. of white polyacrylonitrile (=76%, calculated on the amount of acrylonitrile used) was obtained which had a relative viscosity in a 1% dimethylformamide solution of 1.35.

What is claimed is:

1. In a process in which vinyl compounds that contain electron attracting substituents, diluted with an inert solvent, are polymerized under anhydrous conditions to a solid product, the polymerization being initiated by a tertiary phosphine of the general formula:

wherein $R_1$, $R_2$, and $R_3$ are members selected from the group consisting of alkyl and aryl radicals and mixtures thereof and wherein the tertiary phosphine is dissolved in an inert solvent, the improvement which comprises carrying through the said polymerization in the presence of 0.5 to 5 percent by weight of an alkali metal compound selected from the group consisting of alkali metal hydrides, alkali metal borohydrides, and alkali metal aluminum hydrides.

2. The process set forth in claim 1 wherein the tertiary phosphine is triethylphosphine.

3. The process set forth in claim 2 wherein the alkali metal compound is sodium hydride.

4. The process set forth in claim 1 wherein the alkali metal compound is sodium hydride.

References Cited in the file of this patent

UNITED STATES PATENTS

| | | |
|---|---|---|
| 2,675,372 | Coover et al. | Apr. 13, 1954 |
| 2,826,598 | Ziegler et al. | Mar. 11, 1958 |
| 2,832,759 | Nowlin et al. | Apr. 29, 1958 |
| 2,846,427 | Findlay | Aug. 5, 1958 |
| 2,881,156 | Pilar et al. | Apr. 7, 1959 |
| 2,921,055 | Heisenberg et al. | Jan. 12, 1960 |
| 2,924,589 | Jurgeleit | Feb. 9, 1960 |